Feb. 18, 1958  R. J. HARDY ET AL  2,824,242
CONTROL CIRCUIT FOR POSITIONING AN OBJECT
Filed Dec. 19, 1955  3 Sheets-Sheet 1

United States Patent Office 2,824,242
Patented Feb. 18, 1958

2,824,242

CONTROL CIRCUIT FOR POSITIONING AN OBJECT

René J. Hardy, Le Chesnay, and Yves L. Le Port, Triel, France, assignors to Drivomatic (Société à Responsabilité Limitée), Paris, France, a French company Application December 19, 1955, Serial No. 554,067

Claims priority, application France January 19, 1955

13 Claims. (Cl. 307—149)

This invention relates to control circuits, and particularly though not exclusively to circuits for deriving one or more variable voltage signals usable for controlling the position of an object about one or more related control axes thereof, in response to the relative position of a target object about a reference axis of said object. The teachings of the invention are of especial advantage in connection with the automatic guiding of an aircraft or missile towards a target, and/or automatic fire control on land, sea or air.

One object of this invention is to derive a control signal which is responsive to the instant of occurrence of a datum signal within the cycle of a periodical reference voltage.

Another object is to derive a pair of control signals respectively responsive to the instant of occurrence of a common datum signal within the cycle periods of two phase-displaced reference voltages, and a more specific object is to derive such a pair of control signals applicable for positioning a structure about a pair of control axes thereof.

A further object is to provide improved means for generating periodical reference voltages of predetermined waveform; an object is to generate periodical voltages of predetermined waveforms having a predetermined phase relationship with each other and usable as reference voltages in connection with a scanning system.

Further objects relate to the provision of improved scanning means adapted to generate a datum signal corresponding to the angular position of a target object about a reference point or axis, and to the provision of combined means for generating such a datum signal and simultaneously generating periodical reference voltages at a common frequency corresponding to the scanning frequency and bearing a predetermined phase-relationship with one another.

Yet another object is to provide improved separation between a weak alternating signal and a comparatively strong noise signal associated therewith.

Another object is to provide an improved phase-meter circuit.

Still another object is to provide an improved rectifier arrangement for converting a constant-amplitude signal occurring at a variable instant within the cycle of a reference voltage, into a variable output signal usable for control purposes.

Further objects will appear as the description proceeds.

According to one important aspect of the invention, a symmertical periodical reference voltage is applied to a pair of reversely connected rectifiers in parallel, and a datum signal or pulse having a magnitude greater than the crest value of the reference voltage, is applied with opposite polarity characteristics to both rectifiers. Thus the common output of the rectifiers will normally deliver a zero output voltage since the altrenate half cycles of the reference voltages passed by the respective rectifiers will cancel out; on occurrence of a datum pulse however, the voltage of the pulse will add to the instantaneous reference voltage value in one rectifier and will subtract therefrom in the other rectifier, whereby the output will deliver a net signal having the instantaneous value of the reference voltage, which signal will be representative of the instant of occurrence of the event that generated said datum signal, relative to the cycle of the reference voltage.

According to a further aspect of the invention, two reference voltages in phase quadrature are provided and each is applied to a related pair of reverse rectifiers, the datum pulse being applied with appropriate polarity characteristics to each rectifier. For this purpose, in one desirable embodiment, the inputs to each pair of reverse rectifiers are connected with the opposite ends of a transformer winding to the midpoint of which the reference voltage is applied, both said windings being inductively coupled with a third winding to which the datum pulse is applied. Thus the pulse is automatically applied by induction with the proper polarity characteristics and with equal amplitude to each rectifier in each pair.

In order to provide a well-defined pulse representative of the instant at which a certain datum effect—such as the picking up of a target object by a suitable scanning system—has occurred, the signal generated by said datum effect, such as the output signal from a photo-electric cell forming part of an optical scanning system, is preferably applied to a blocking oscillator circuit wherein the coupling between the oscillator tube electrodes includes means, such as a suitably biassed damping resistance, for causing a spontaneous blocking of the oscillator after a single unidirectional swing of the datum signal. The third above mentioned inductive winding may then advantageously constitute an inductance coupling the said oscillator tube electrodes.

As already stated the invention is applicable with particular advantage to automatic guiding, positioning, and aiming systems provided with optical scanning means and photo-electrical pick offs wherein the presence of a target object in the optical field of the scanning system will generate the above mentioned datum signal. This signal is then converted as outlined above into one or more control signals adapted to be applied to a siutable positioning servo-system for aiming the system at the target. The instant of occurrence of the datum pulse can thus be converted by phase comparison with the reference voltage or voltages into one or more signals representative of one or more coordinates, linear or angular, determining the position of the target with respect to a reference point of the scanning field. For this purpose the scanning system may be operatively associated with means for generating the periodical reference voltage or voltages, e. g. two reference voltages in phase quadrature. The common output of each above mentioned pair of rectifiers will then deliver an output which, preferably after integration or smoothing, may be applied as a control signal to a respective channel of the positioning servo-system for angularly positioning the scanning system and therewith the structure on which the entire system is installed.

Thus, the use of two reference voltages in phase quadrature as just mentioned may be used for positioning the controlled structure about two control axes thereof at right angles to each other and to the longitudinal reference axis of the scanning system e. g. for positioning the structure in a right-left and an up-down direction. In cases where the structure is an aircraft or missile, the resulting two control signals may be applied to the yaw and pitch channels, respectively, of an automatic pilot system of the craft.

In optical scanning systems the field of vision containing the target is usually scanned by means of a movable window or slot, e. g. a radial slot in a rapidly revolving disc arranged between the target and a photoelectric cell, the light pencil that passes through the window being chopped as by a multiplicity of fine slits. Thus, as the scanning window moves past the image of a highly contrasted target object, the photo-cell will yield a multiplicity of small pulses at a predetermined frequency corresponding to the rate of displacement of the above mentioned fine slits. In accordance with the invention, this signal is selectively amplified in a frequency-selective amplifier to yield a corresponding symmetrical signal of increased amplitude.

Furthermore, in utilizing such a signal in the phasemeter portion of the improved control circuit, the signal has to be separated from the noise component superimposed thereover, which noise component is primarily due to the random variations in brightness of the optical scanning field, as converted into random electric voltage by the photo-cell and subsequently amplified together with the useful signal component. To effect such separation according to the invention, the symmetrical signal is applied to a pair of reversely mounted rectifiers having their outputs connected through a pair of integrator networks having predetermined different time constants, and thence to the control grid of a blocking tube. Thus, one of the rectifiers will pass one set of alternate half-cycles of the modulated noise signal and the useful signal and will apply to said grid an average biassing voltage value whereby the bias voltage on the grid will be the more negative as the total noise amplitude is greater, while the other rectifier, which has an output network with a shorter time constant, will pass the other alternate half-cycles and yield substantially the envelope of the noise and useful signal. Automatic bias control is thus obtained on the blocking tube and at the same time the envelope of the signal to be detected is applied thereto, the former negative and the latter positive.

The objects features and advantages of the invention, outlined above as well as others, will appear from the ensuing description relating to an exemplary embodiment of the invention selected for illustration but not of limitation, with reference to the accompanying drawing wherein.

Figure 1:
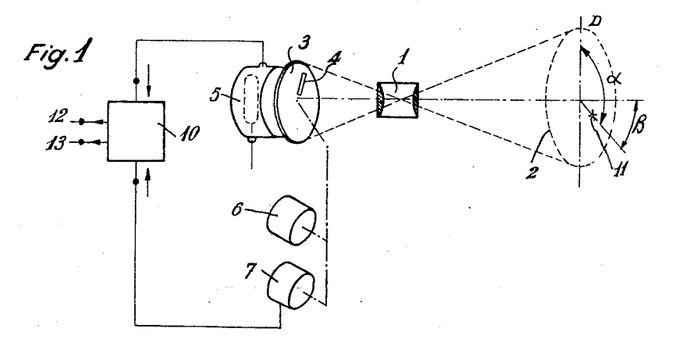
Fig. 1 is a general functional diagram, partly in simplified perspective and partly in block form, illustrating the operating principle of the invention.

Referring particularly to Fig. 1, there is provided an optical objective system or lens 1 adapted to form an image of a predetermined field of space 2 upon a rotatable disc 3 in which a radial slot 4 is formed. The disc 3 is driven in rotation from an electric motor 6 through any suitable mechanical drive indicated by chain lines on the figure. Located beyond the disc 3 coaxially with it and with lens 1 is a photo-electric cell 5.

Motor 6 in addition to drive the disc 3 also drives an electric generator 7 adapted to generate a reference or timing signal train. The generator 7 may comprise any suitable apparatus and the reference signals generated thereby may assume any desired periodical waveform, e. g. sinusoidal, or square or triangular pulses. Moreover the timing signals may be multi-phase in character, having any suitable phase displacements that are simple fractions of their cycle period.

In accordance with the invention, signals emitted from the photo-cell are made to cooperate with the reference signals from generator 7 in a circuit 10 shown in block form in Fig. 1, and one preferred example of which is described in detail hereinafter. The circuit 10 delivers across the output terminals 12 and 13 thereof an output signal which may comprise an angular coordinate of a target object 11 located within the field 2. The resulting output signal may thus be applied to suitable positioning servo system for pointing a gun at the target or for guiding an aircraft or missile towards said target, or any other suitable purpose, as more fully described hereinafter.

In one advantageous application of the present invention, to which particular reference will be made in the ensuing disclosure, the output signals are applied to the yaw and pitch channels or an automatic pilot system serving to operate control surfaces of an aircraft or missile in order to guide it automatically towards the selected target.

Some practical forms of construction of the means indicated schematically by generator 7 in Fig. 1 for deriving suitable reference signals in accordance with the invention will now be described. As already stated, the unit 7 may comprise a one or more phase A.-C. generator, e. g. of the type comprising an annular magnetic core suitably rotated relative to fixed field windings in order to generate a pair of sine-wave output voltages in phase quadrature. However, in order still further to reduce the weight and size of the reference signal generator, as is found desirable in connection with the small fast type of craft or missile with which it is contemplated that the invention may be utilized, the invention may use independent electronic means arranged to emit suitable pulses and the motor-driven unit 7 may then simply constitute a device for synchronizing such pulses. Figs. 2 to 7 illustrate various means for producing such pulses as well as the synchronizing means therefor.

The reference signals may be provided in the form of pure sine waves in quadrature, whereby the angular coordinates of a target may be accurately defined at any instant as the values of said output voltages respectively proportional with the sine and cosine of said angle. The control signals respectively fed into the yaw and pitch channels of the automatic pilot will then at any instant provide accurate control of the craft in course and altitude for guiding it towards said target. However, it will be understood that satisfactory results may also be had somewhat more simply with the use of a "hit-or-miss" type of operation wherein the reference signals are in the form of square waves. In accordance with another simplified form of the invention, the reference signals may be provided as triangular waveforms. In fact triangular waveform signals will often be found to provide a higher degree of approximation than sine wave signals, provided the triangular waves possess a moderately high degree of linearity. This is because the error incurred in substituting a linear triangular waveform for a sinusoidal one, will frequently be much lower than the error accompanying a poor approximation of the sinusoidal signals.

Whatever the type of rectangular, triangular or sinusoidal or other waveform selected for the reference signals, such signals may be produced in a variety of conventional ways well known to those familiar with the art, such as rotating capacitors or synchros, etc., and or means generating short sharp synchronizing pulses, involving magnetic or photo-electric effects.

Figure 2:
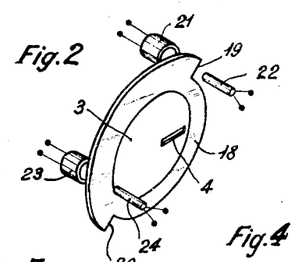
Fig. 2 is a perspective view of one form of photoelectric device for generating two reference voltages in phase quadrature associated with an optical or photo-electrical scanning disc.

One example for producing rectangular reference signals using photo-electric means is illustrated in Fig. 2. In this figure the afore-mentioned disc 3 formed with the slot 4 therein has a flat annular ring 18 secured around it. The ring 18 is made of opaque material and is formed with a semi-circumferential cut out in its periphery with diametrical edges 19 and 20. Thus in the rotation of the disc the ring 18 will alternately cover and uncover the light source 21 for alternate halves of each revolution so as to induce in the photo-cell 22 a rectangular output signal corresponding in duration to one half of one each revolution. An output signal is thus generated which alternately has a low and a high voltage value. A second light source 23 displaced 90° from source 21 around the ring periphery will similarly induce in an associated photo-cell 24 a further rectangular signal train in phase quadrature with the first. The sources 21, 23 may emit either visible or infra-red light.

Figure 3:
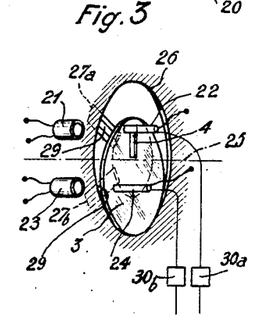
Fig. 3 illustrates another form of photo-electric device for generating two reference voltages in phase quadrature wherein the generated reference voltages are sinusoidal.

Fig. 3 illustrates one way of producing a pair of sine wave signals in phase quadrature using a pair of light sources 21 and 23 and a pair of associated photo-cells 22 and 24 similar to the arrangement in Fig. 2. Here the disc 3 formed with the radial slot 4 is excentrically mounted on its axis of rotation 25, so as to remain tangent during rotation thereof to the circular edge of an aperture 26. Arranged between the sources and the related photo-cells are screens 27a and 27b respectively, each formed with a slot 29 extending radially with respect to the rotational axis 25. Thus the amount of light impinging on the cells 22 and 24 will be proportional to the length of slot 29 uncovered within the gap between disc and edge 26, and since such uncovered length will vary according to a sine law, the output voltages from amplifiers 30a and 30b connected to the photo-cell outputs will be substantially sine-shaped and in phase quadrature to one another.

An alternative way of generating to reference signals is by electro-magnetic or inductive means. Thus, periodic signals or pulses may first be generated by a magnetic head and then such signals may be converted into any desired form, through suitable forming or shaping circuits.

Figure 4:
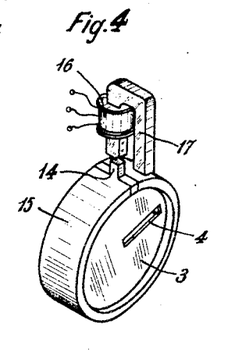
Fig. 4 illustrates in perspective a magnetic device for generating a reference voltage.

In the construction shown in Fig. 4, a lug 14 made of magnetic material, projecting radially from the periphery of annular member 15 surrounding the slotted disc 3 and secured thereto, is adapted at each revolution to project into the path of the magnetic circuit of a magnetic head comprising a U-shaped core 17 having a coil structure 16 associated with one leg thereof. The coil structure 16 may comprise a primary or energizing winding and a secondary or output winding across the terminals of which the desired reference or synchronizing signals will thus be made available. Alternatively the core 17 may be a permanent magnet and coil 16 may comprise a single output winding.

Figure 5:
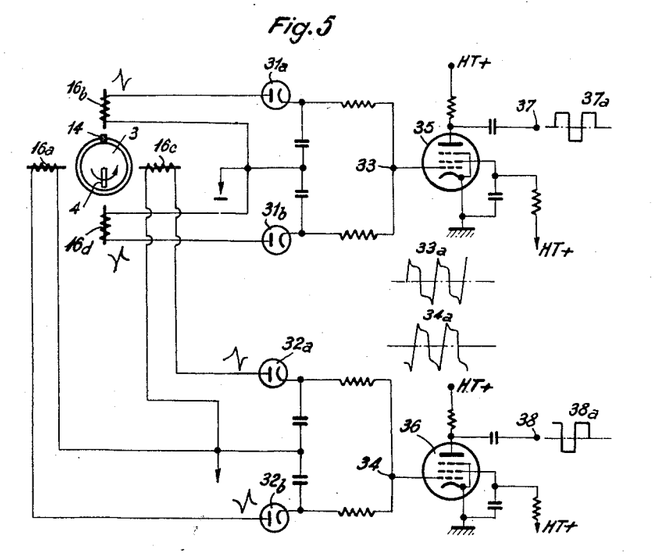
Fig. 5 illustrates a circuit for generating two reference voltages of square-wave form in phase quadrature, utilizing magnetic means similar to that shown in Fig. 4.

Four electro-magnetic assemblies similar to the assembly 16—17 just described may be disposed in equi-angular relationship around the periphery of the rotating member 15, whereby four output pulses in 90° phase displaced relation will be obtained. These pulses may then be passed through a suitable shaping circuit in order to convert them into two quadrature trains of square pulses. One example of a suitable circuit for this purpose is illustrated in Fig. 5.

This figure diagrammatically shows the revolving assembly including slotted disc 3 with magnetic lug 14 projecting therefrom and the four 90°-displaced electromagnetic pick-off units having the output windings 16a, 16b, 16c and 16d respectively. The diametrically opposed pair of windings 16b and 16d have their one ends interconnected and their opposite ends connected with the plates of a pair of rectifier diodes 31a, 31b. Similarly windings 16a and 16c have their one ends interconnected and their other ends connected to the plates of diodes 32a and 32b. The cathodes of both diodes in each pair are connected through a resistance-capacitance differentiating network to an output junction designated 33 in the upper pair, and 34 in the lower pair. In each pair the output windings such as 16b and 16d are so connected that one will emit a positive-going pulse as the lug 14 moves past it, and the other will emit a negative-going pulse as the lug moves past it. After rectification in the respective diodes and differentiation in the networks, the waveforms appearing at junctions 33 and 34 will have the crudely rectangular shapes indicated at 33a and 34a respectively, in phase quadrature with respect to one another. The junctions 33 and 34 are connected to the control grids of a pair of conventional shaper and amplifier pentodes 35 and 36 in which the signals are amplified and clipped due to the action of the screen grids of the pentodes. Thus substantially pure rectangular output pulses are available on the plate terminals 37 and 38 of the pentodes, as indicated by the waveforms 37a and 38a.

The above has disclosed one manner of generating a pair of phase-quadrature trains of square reference pulses or signals suitable for the purposes of the invention. Means will now be described with reference to Fig. 6 for utilizing such reference signals in conjunction with the angular coordinate signals derived from the photo-electric cell pick-off 5 of Fig. 1, in order to produce a pair of control signals usable in the pitch and yaw channels of an automatic pilot for automatically guiding a missile towards the selected target.

In the exemplary circuit of Fig. 6 however, different means have been illustrated for developing the square wave reference signals, from those just described with reference to Fig. 5. Instead, Fig. 6 shows for this purpose a pair of photo-electric cells 22 and 24 forming part of an arrangement similar to the one described earlier herein with reference to Fig. 2.

Figure 6:
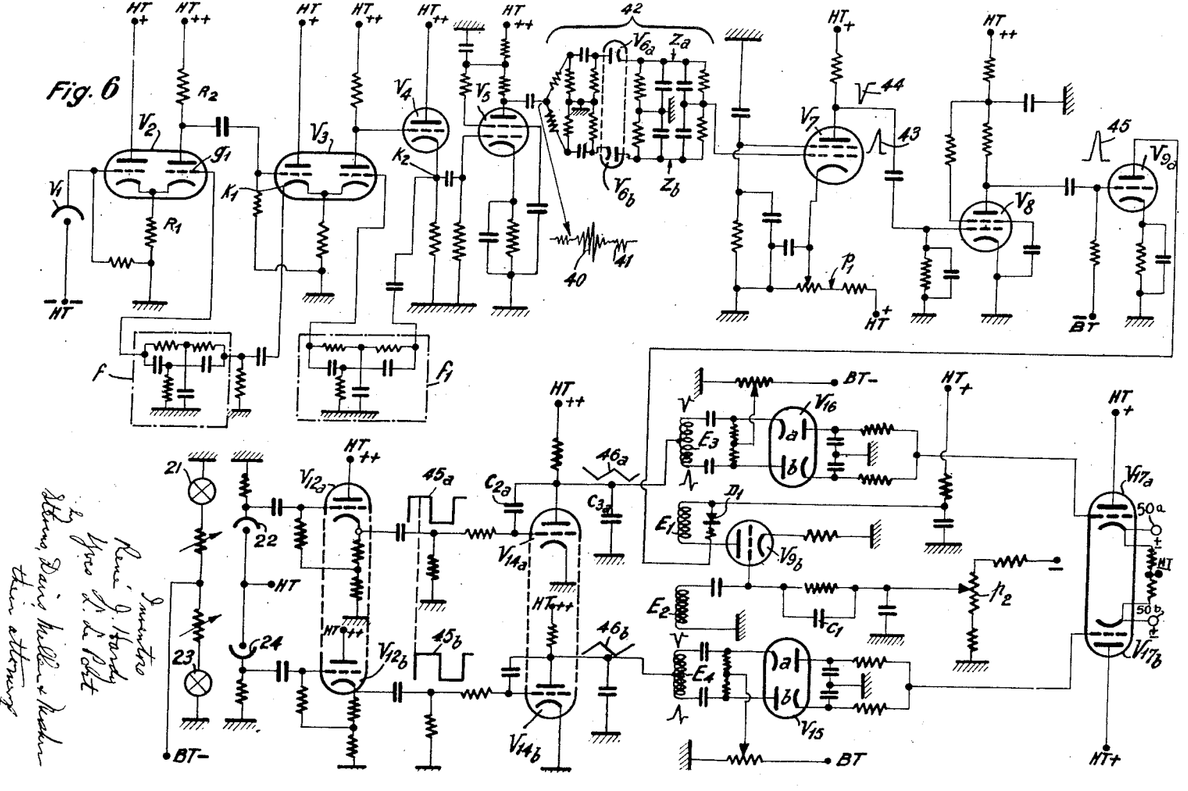
Fig. 6 shows a circuit diagram of one embodiment of a complete control circuit according to the invention utilizing for exemplary purposes photo-electric scanning means and a photo-electrical reference voltage generating device which may be similar to that shown in Fig. 2.

In the circuit of Fig. 6, a photo-cell corresponding to the one indicated at 5 in Fig. 1, is conventionally indicated at V1 at the upper left of the circuit diagram. In practice the radial slot 4 of Fig. 1 can be regarded as consisting of a multiplicity of narrow juxtaposed slots, so that the signal generated by the photo-cell each time it receives the image of the target 11 as the slot 4 moves past it, will assume the form of a pulse train. The cathode of photo-cell V1 is connected to a high negative potential, and its anode is directly connected to the control grid of a cathode follower triode section of a twin triode tube V2. The arrangement just described serves to avert any capacitive coupling between the photo-cell and the amplifier input tube and thus prevents a microphonic effect which would otherwise give rise to objectionable noise due to the vibrations set up by the rapidly revolving assembly comprising the disc 3.

The first triode section of twin tube V2 is mounted in a cathode follower circuit and its cathode load resistance R1 is inserted in the common cathode connection of both triode sections of tube V2. The cathode follower circuit just mentioned has several advantages. It makes it possible to provide a high output impedance for photo-cell V1 thereby decreasing the load thereon and increasing the sensitivity of the cell without increasing background noise. At the same time the output signal from the tube V1 can be passed to the next amplifier stage V3 through a low-impedance coupling. The output signal from the first stage V2 is obtained on the anode resistance R2 of the second triode section of the tube and is fed through a coupling capacitance to the grid of the first triode section of a further twin triode amplifier tube V3. Connected between the cathode K1 of this section and the grid of the second triode section of the first amplifier tube V2 is a filter $f$ of the double-T type comprising in a known manner a parallel arrangement of two resistance-capacitance filter networks one of which has high pass and the other low-pass characteristics, the cut-off frequencies of the two filter sections of the double-T network $f$ defining between them a narrow frequency band corresponding to the frequency of the pulse train emitted from photo-cell V1 due to the fine-slot structure mentioned above. Frequencies within this narrow band are blocked by filter network $f$ and are not applied to the second triode section of tube V2. Frequencies above and below said band however are passed by the filter network $f$ to produce a negative feedback action effective to induce a sharp drop in amplification gain for all frequencies outside the band. In this way a selective feedback coupling is provided which causes frequency-selective amplification of only those frequencies within the selected band.

The amplified signal from the output anode of twin tube V3 are given a further stage of frequency-selective amplification in a triode V4 again mounted as a cathode follower with a similar double-T filter network $f_1$ in a feedback connection extending from the cathode of tube V4 to the grid of second triode section of tube V3.

The two-stage frequency-selective amplifier circuit described provides only moderate gain; on the other hand the circuit is highly stable with time. Moreover distortion is minimized and any variation in the cathode heating voltage supply are automatically compensated for; this is an important consideration in connection with fast lightweight craft or guided missiles wherein the supply voltage may be common to a great number of units of ancillary equipment and hence is liable to wide variation in service.

The amplified signal from the cathode of tube V4 is capacitively coupled to the control grid of a final tetrode amplifier stage V5 and a further amplified signal is made available across the anode resistance of said tube. The output signal from tube V5 superimposed over background noise which may present crest-to-crest variations of the order of several volts in magnitude in the null condition of the system. In an optical scanning system of the character herein described the noise voltage may vary tenfold in response to variation in sky brightness. The useful signal will follow such variations and since the contrast between the target and the sky increases with the sky brightness, the increased noise level would not, in theory, be an obstacle to the proper operation of the system.

For improved results however, the illustrated circuit includes means for separating the useful signals (as indicated at 40 in Fig. 6) from the background noise (indicated at 41) whenever the signal magnitude exceeds by more than a given value, say 30%, the magnitude of the random noise. This separating function is fulfilled herein by the separator network 42 which includes rectifying means and passive filter means so arranged as to produce an automatic clipping action whereby the useful signal is separated from the peaks of the noise signal which are distributed in a statistically random or uniform manner over a wide frequency band. Separator network 42 comprises a pair of diodes $V6_a$ and $V6_b$ oppositely mounted in parallel arms of the network and followed by respective integrator networks $Za$ and $Zb$ which may be similar as shown, but are selected with different circuit constants to provide a substantially shorter time constant for network $Z_a$ than that of network $Z_b$. The combined noise and useful signal such as 40—41, which possesses a practically symmetrical positive-negative over-all pattern, is applied through a suitable filter network simultaneously to both oppositely connected diodes $V6_a$ and $V6_b$. In the upper diode $V6_a$ the positive parts of the total signal are rectified and are then passed through the short-time integrating network $Z_a$ in which the signal is integrated to a moderate degree. Thus this network yields at its output a positive variable D.-C. voltage which corresponds to the smoothed-out noise voltage, together with an envelope of the useful signal superimposed thereover.

In the lower diode $V6_b$ the negative portions of the total signal are similarly rectified and are passed through the long-time integrating network $Z_b$ which delivers at its output a negative D.-C. voltage which will be approximately proportional to an average value of the noise voltage, but will substantially not depend on the signal voltage. The mixed output from both networks $Z_a$ and $Z_b$ is applied to the control grid of a blocked tetrode V7. The mixed output contains in addition to the useful signal component a residual non-integrated noise component adapted to bias said grid negatively an amount substantially proportional to the strength of said residual noise.

Variations in useful signal amplitude only result in negligibly small variations in the average rectified voltage, and the partially integrated useful signal appears as a positive voltage signal 43 in which the amplitude variations may be reduced in a ratio of e. g. 5 to 1. Thus the circuit described simultaneously functions as a dynamic limiter whereby the signals 43 applied to the grid of tube $V_7$ will only present restricted amplitude variations.

The bias of tube V7 is initially adjusted manually by means of a potentiometer $P_1$ so that the tube will remain cut off so long as the positive swing of the input signal 43 does not exceed the residual noise level by a given amount, say 30%. When the signal exceeds the background noise by more than this amount the tube conducts and a negative pulse 44 appears on the output resistance connected to the anode of the tube. As already stated, in case of a momentary increase in ground noise level the grid bias is automatically made more negative so that the desired operation is maintained without having to correct the adjustment of potentiometer $P_1$ manually.

It may further be noted in connection with separator circuit 42 that owing to the fact that the two rectifier diodes are reversely poled so as to pass opposite polarity portions of the total signal, there is no interference between the two arms of the rectifier circuit. A further advantage of the arrangement described is that it will inherently provide the negative grid biassing voltage and the positive useful signal voltage with the proper respective polarities.

As stated, the anode impedance of tube V7 delivers negative output signals and these are fed to the control grid of a further tetrode V8 operated as an unsaturated amplifier, the grid being normally biassed to the cathode potential therein. When the input signals 44 to the tube V8 exceed the cut-off point of the tube, the excess portion of the signal does not appear in the anode circuit of the tube; thus the output of tube V8 delivers constant-amplitude signals and these are applied to the control grid of a triode $V9_a$ serving as a coupling and inverting amplifier. The output signal from the anode of tube $V9_a$ is then applied through a diode D1 to an inductive winding E1 connected to the anode of a blocking oscillator triode $V9_b$. It is noted that triodes $V9_a$ and $V9_b$ may advantageously constitute sections of a twin triode tube, even though both triodes have been shown separate for clarity.

The grid of blocking oscillator tube $V9_b$ is normally maintained beyond cut-off by a negative bias applied thereto through potentiometer $p2$. Said grid is, moreover, coupled to the anode of the tube through an inductive coupling comprising the aforementioned anode inductance E1 and the grid inductance E2 closely coupled thereto. On application of the positive signal 45 to winding E1, the normal cut-off bias on the tube is offset by the signal voltage and the tube conducts. The tube thus operates as a one-shot oscillator wherein a high-amplitude oscillation tends to be generated at a predetermined natural frequency on application of a signal to the anode inductance E1. However, owing to the presence of rectifier diode D1, the oscillation is suppressed during the next half-cycle thereof. Moreover a time delay network including capacitance C1 is interposed in the grid biassing circuit of the tube between the grid and biassing potentiometer $p2$, so that should the time duration of the applied input signal 45 exceed a predetermined value, an additional negative bias will be applied thereto from the capacitance C1 thereby preventing the establishment of a second and spurious oscillation. Both inductive windings E1 and E2 mentioned above form part of a transformer which includes two further windings E3 and E4 whose function will be disclosed presently.

The reference signals in phase quadrature, derived in any of the various ways described hereinabove, are respectively applied to the midpoints of windings E3 and E4. For exemplary purposes the phase-quadrature reference signals are shown in Fig. 6 as derived from an arrangement involving a pair of 90°-displaced photo-cells of the general type discussed above with reference to Fig. 2. Before proceeding with the description of the operation of the last (right-hand) portion of the circuit of Fig. 6 in response to the control signal 45 and the two reference signals, that part of the circuit of Fig. 6 will first be described which serves to derive in effectively usable form the phase-quadrature reference voltages generated by the photo-cells 22 and 24 of Fig. 2.

The cells 22 and 24 are shown at the lower left of Fig. 6 together with the light sources 21 and 23 respectively associated therewith. Each cell, such as the cell 22 delivers a generally square wave output whose phase condition defines the angular position of the revolving disc 18. The square wave voltage is amplified in the triode section $V12_a$ of a dual amplifier tube each section of which is connected in a cathode follower circuit. The amplified square-wave voltages in phase quadrature obtained from the cathode outputs of the dual tube, and designated 45a and 45b in the figure, are fed to respective ones of a pair of Miller-type integrators comprising the tubes $V14_a$ and $V14_b$ constituting triode sections of a dual triode tube; connected with the anode of each triode e. g. $V14_a$ are capacitance $C_{2a}$ and $C_{3a}$. The conventional integrating arrangement thus provided acts to convert each square wave form such as 45a into a triangular wave form 46a and 46b having a high degree of linearity, of the order of 99%. These triangular voltages phase-displaced 90° from one another are applied to the midpoints of the windings E3 and E4 coupled with the blocking oscillator tube $V9_b$ as already stated.

The opposite ends of each windings E3 and E4 are connected to the respective diode sections of a related twin rectifier tube V16 and V15, the diode sections in each tube being reversely poled. The outputs of both twin-diode tubes V15 and V16 are fed through suitable integrator or filter networks to the control grids of respective triode sections $V17_a$ and $V17_b$ of an output tube mounted as cathode followers. The cathodes of both triode sections are connected to a pair of output terminals $50_a$ and $50_b$ which constitute the output terminals of the system, and may be connected to the respective pitch and yaw channels of a conventional auto-pilot system operating the control surfaces of the craft or missile that is to be guided towards the target.

Each triangular reference voltage such as 46a applied to the midpoint of the related winding such as E3, has its alternate half-cycles respectively rectified in the reversely poled diodes such as $V16_a$ and $V16_b$, so that the resulting output after removal of the A.-C. component thereof in the integrating a filter networks, is normally zero.

Figure 7:
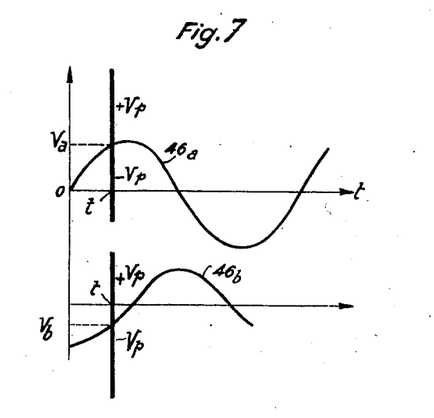
Fig. 7 is a chart for explaining the operation of the rectifier system utilized in part of the circuit of Fig. 6 for producing output control signals representative of the occurrence of the datum event or signal within the cycle periods of the respective phase-quadrature reference voltages.

However when a signal such as 45 is applied to winding E1 indicating that a target object is present within the scan field of the optical pick-up device described hereinabove, the blocking oscillator tube $V9_b$ generates an output pulse and each such pulse is applied from anode winding E1 to each of the two windings E3 and E4 closely coupled therewith. In each of the latter windings e. g. E3, the oscillator output pulse appears with opposite polarities at the opposite ends of the winding. $V_p$ indicates (Fig. 7) the amplitude of the oscillator output pulse, and $V_a$ indicates the instantaneous value of the reference voltage such as 46a, at the instant $t$ of occurrence of the oscillation pulse. The circuit characteristics are so selected that $V_p$ is greater in absolute value than the maximum absolute value of $V_a$. As previously said, in each cycle of the reference voltage 46a, the positive half-cycle balancing the negative one, during one cycle, through one diode section passes the supplementary voltage $V_p$ while in the other diode section passes only with the reverse polarity the supplementary voltage $V_p-V_a$. Consequently during this cycle the resulting voltage output applied to the grid of output tube $V17_a$ is $$V_p-(V_p-V_a)=V_a$$

its magnitude will be independent of the value of the input signal 45, but will depend on the instantaneous value assumed by the reference voltage such as 46a at the instant said input signal 45 has occurred. Similarly a voltage $V_b$ is delivered at the common output of the diodes $V15_a$ and $V15_b$.

Thus on each occurrence of a signal, there are applied to the control grids of the output tube V17 two voltages in phase quadrature, and respectively corresponding to the values assumed by the reference voltages at the instant of occurrence of said signal, whereby the instant of occurrence of the signal is unambiguously defined in terms of its phase relationship with the reference voltages.

In cases where the reference voltages 46a and 46b are sinusoidal, the output values $V_a$ and $V_b$ are respectively proportional to the sine and cosine of the phase angle of the instant of occurrence of the signal with respect to the null of the reference voltage. Thus, referring to Fig. 1, the said phase angle would be for example the angle formed between the radial slot 4 and a fixed reference direction, such as the upward vertical through the center of the disc 3. The said output values $V_a$ and $V_b$ can therefore be used to control the craft about its pitch and yaw axes respectively to guide it towards the target.

Assuming for example the target 11 located in the second quadrant of the circular field of sight, as shown in Fig. 1, then the voltage $V_a$ proportional to the sine will be negative and will call for down-elevator, while the voltage $V_b$ proportional to the cosine will be positive and call for right-rudder. Similarly if the target 11 were in the first quadrant rather than being in the second quadrant as it is shown to be, the sine voltage $V_a$ would be positive and the cosine voltage $V_b$ would be positive, calling for up elevator and right rudder. Thus, depending on the particular quadrant that the target 11 is located at a particular instant about the optical axis of the scanning device, the output voltages $V_a$ and $V_b$ applied to the triodes $V17_a$ and $V17_b$ will have the proper polarities for directing the craft so as to center the target on the optical axis of the scanning system.

The voltages $V_a$ and $V_b$ fed through the respective triode sections of power amplifier tube V17, which are connected as cathode followers, appear on the output terminals $50_a$ and $50_b$ whence they may be fed to the pitch and yaw channels of a conventional automatics pilot system of any suitable type as already stated.

It will be understood that part of the yaw signal may simultaneously be fed to the bank channel of the auto-pilot in order to provide for coordinated rudder and aileron control as is well-known in the art.

In cases where the reference voltages 46a and 46b instead of being sine waves as assumed in the foregoing discussion are triangular waves as they are shown to be in Fig. 6, a certain amount of error is present in the control signals, but such error is generally small and its percentage amount predictable. The difference between the actual triangular wave and the true sine wave is usually very limited owing to the inevitable rounding-off of the apices of the triangular wave, due to the imperfectly vertical character of the sides of the square wave pulses from which the triangular wave was derived. It has been found in any case that the above-mentioned error will at no point exceed a relative value of about 5%. It will in fact generally be found more advantageous to use triangular-wave reference voltages which can be produced with a very high degree of linearity (particularly through the use of Miller type integrator circuits as described) and which will provide a small, determinable, amount of error in the control signals, rather than employing approximately sinusoidal waveforms in which the error with respect to a true sinusoid is unpredictable and may frequently considerably exceed 5%.

As already indicated, square or rectangular waveforms may likewise be used as reference signals for the purposes of the invention. In such cases the craft will be guided on a "hit-or-miss" basis; that is, the control signals delivered by the circuit of the invention will depend only on the direction of displacement off-centre but not on the amount of such displacement, the control effect being the same no matter whether the target is displaced off-centre a small or a large amount, both in the left-right and the up-down direction. Thus, in this instance that part of the circuit of Fig. 6 including windings $E_3$, $E_4$, and the diode rectifiers V16 and V15 and associated networks each constitute in effect a form of "on-off" phase-discriminator circuit, which will deliver a rectified voltage of constant amplitude and of a polarity dependent on the phase relationship between the useful signal and the reference voltages.

The smoothing or integrating networks provided at the output of each phase-discriminator V15 and V16 may be selected with short time constants so that the rectified output signals will possess a residual alternating component. This makes it possible to obtain a very short time constant at the beginning of the occurrence of an input signal, and a somewhat longer time constant on disappearance of a signal, thereby securing a desirable "memory" effect which promotes smooth guidance. At the same time it will be noted that despite this tendency of an error signal to persist for some time after the target has reached its reference position, such error signal will instantly vanish and be replaced by an error signal of opposite polarity should the target cross said reference position.

The above advantageous characteristics of the output signals are preserved owing to the use of cathode follower tubes in the output stage V17. Due to the low output impedance of the cathode followers, the final output signals appearing on terminals 50a and 50b are substantially undistorted.

It will be understood that the exemplary circuit described herein may be modified in a variety of ways within the scope of the invention. Thus, in certain applications of the system, and particularly in cases where the invention is applied to ground aiming and fire-control systems, stationary or movable, the output voltages may be derived without integration, as in the form of pulse trains of a polarity and amplitude characteristics depending on the relative position of the target with respect to its reference, and such pulse trains may be directly used in suitable control devices of conventional type, e. g. vibratory relay or similar circuits.

The output signals provided by the system, or derived at some points of the circuit thereof, may be modified in any appropriate manner as by mixing with other signals corresponding to desired variables or parameters which may be derived from the signals themselves, such as rate, acceleration or integral components, or may represent some external condition or factor, e. g. wind drift, whereby the flight path of a craft or missile or the aiming position of a firearm or other object being controlled, may be modified and corrected for improved performance.

While optical-electrical detecting means have been particularly illustrated and referred to herein, it will be understood that the precise nature of such means is immaterial to some of the aspects of this invention. Thus electro-magnetical radiations other than light, e. g. radar waves, or other suitable physical factors may be employed as will be apparent to those familiar with the art.

What we claim is:

1. A control circuit comprising, means for producing a periodical reference voltage, a pair of rectifiers, means for applying said reference voltage to opposite-polarity electrodes of said rectifiers in cophasal relation, means for integrating and combining the outputs from the remaining electrodes of said rectifiers to produce a combined integrated output that is substantially zero, means adapted for generating a signal at a variable instant within a cycle period of said reference voltage, means for deriving from said signal a pair of pulses of positive and negative polarity respectively and having a constant magnitude greater in absolute value than the crest value of said reference voltage, and means for applying said positive and negative pulses to the positive and negative one, respectively, of said first mentioned rectifier electrodes, whereby there is obtained a combined integrated output voltage corresponding to the instantaneous value of said reference voltage at the instant of occurrence of said signal within said cycle period.

2. A control circuit comprising, means for producing a periodical reference voltage, a pair of rectifiers each having a cathode and an anode, means connecting said reference voltage producing means with the anode of one and the cathode of the other rectifier for applying said reference voltage in cophasal relation thereto, a common output, integrating network means connected on one side with the cathode of said one and the anode of said other rectifiers and connected on the other side with said common output, means adapted for generating a signal at a variable instant within a cycle of said reference voltage, means for deriving from said signal a positive and a negative pulse of predetermined magnitude, and means connecting said pulse deriving means with said rectifiers for applying said positive pulse to the anode of said one rectifier and said negative pulse to the cathode of said other rectifier.

3. A control circuit comprising, a pair of rectifiers each having a cathode and an anode, a first inductance connected across the anode of one and the cathode of the other rectifier, means connected to a midpoint of said first inductance for applying thereto a periodical reference voltage, means adapted for producing a signal pulse of predetermined magnitude at a variable instant within a cycle of said reference voltage, a second inductance connected with said signal producing means and coupled with said first inductance, and common output means connected with the cathode of said one rectifier and the anode of said other rectifier, whereby said common output will deliver a signal corresponding in value to the instant of occurrence of said signal pulse within the cycle.

4. A control circuit comprising, a pair of rectifiers each having a cathode and an anode, a first inductance connected across the anode of one and the cathode of the other rectifier, means connected to a midpoint of said inductance for applying thereto a periodical reference voltage, means adapted for generating a signal at a variable instant in each cycle of said reference voltage, a blocking oscillator circuit including an electron tube normally biased beyond cutoff, means for applying said signal to said tube whereby said oscillator circuit will generate substantially a single unidirectional pulse of predetermined magnitude greater than the crest value of said reference voltage, inductive means coupled with said first inductance and connected with said oscillator circuit for applying said pulse positively to the anode of said one and negatively to the cathode of said other rectifier, and output means connected with the cathode of said one and the anode of said other rectifier for delivering a control signal corresponding in value to the instant of occurrence of said signal within said cycle.

5. In a data-converting system, means producing a periodical reference voltage, means adapted for generating a data signal at a variable instant within a cycle of said reference voltage, a pair of rectifier means having input electrodes connected with said voltage producing means so as to pass opposite-polarity half-cycles of said reference voltage, means coupling said signal generating means with said input electrodes with a polarity and a magnitude such as to cause both rectifier means to conduct simultaneously on occurrence of a signal, and common output means connected with output electrodes of said rectifier means, whereby said output means will deliver a variable output representative of the instant in said cycle that said signal has occurred.

6. In a data converting system of the type specified, means producing a periodical reference voltage, means adapted for generating a datum signal at a variable instant within a cycle of said reference voltage, a pair of rectifier means having input electrodes, a first inductance connected across said input electrodes and having a midtap connected with said voltage producing means so that said rectifier means will pass opposite-polarity half-cycles of said voltage, a blocking oscillator circuit including a tube having an output inductance, means negatively biasing said tube beyond cutoff, means connecting said signal generating means with said inductance and means coupling said output inductance with said biasing means, whereby on occurrence of a signal said tube will produce an oscillatory pulse across said output inductance of a predetermined magnitude greater than the crest value of said reference voltage, means for limiting said pulse to substantially a unidirectional swing thereof, said output inductance being coupled with said first inductance for applying said pulse to said rectifier input electrodes with polarities such as to render both rectifier means simultaneously conductive on occurrence of said pulse, a common output for said rectifier means, and smoothing filter means connected with said common output for delivering a variable signal representative of the instant of occurrence of said datum signal in the cycle.

7. In a system for pointing a structure controllable about two control axes thereof at a target, scanning means on said structure adapted for cyclically scanning said target at a predetermined frequency, pick-off means associated with said scanning means for emitting a datum signal at a point in each scanning cycle corresponding to the angular position of said target about an axis of said structure normal to both said control axes, means for generating a pair of periodical reference voltages in phase quadrature at a frequency corresponding to said scanning frequency, two pairs of rectifier means each having a pair of input electrodes, means for applying each of said reference voltages to both input electrodes of a related pair so that each pair of rectifier means will pass opposite-polarity half-cycles of the related reference voltage, means for deriving from said datum signal a unidirectional pulse of short duration and predetermined magnitude greater than the crest value of said reference voltages, means for applying said pulse to both input electrodes of each pair with a polarity such that both rectifier means in each pair are simultaneously rendered conductive during the application of said pulse, two outputs, smoothing network means connecting each output with both output electrodes of each pair of rectifier means whereby each output will deliver a control signal representative of the instant of occurrence of said datum signal relative to the cycle period of a related one of said reference voltages, and automatic positioning means comprising two channels respective operative for controlling said structure about a related one of its said control axes, said channels respectively connected with said outputs to be responsive to said control signals.

8. In a control system of the type described for positioning a structure about two rectangular control axes thereof in response to the angular position of a target object about a center axis of said structure normal to both said control axes, a radially slotted disc and means for rotating the disc about said center axis, pick-up means on the side of said disc remote from said object responsive to radiations from said objects to emit a data signal as the slot in the disc passes between said pick-up means and said object, means for deriving two reference voltages in phase quadrature at a frequency corresponding to the rate of rotation of said disc, a circuit connected for receiving both said data signal and said reference voltages and operative in response thereto to deliver a pair of control signals respectively corresponding to the instant of occurrence of said data signal relative to the cycle period of each of said reference voltages, and positioning means responsive to said control signals for displacing said structure respectively by rotation about said two rectangular control axes in directions to reduce said respective control signals.

9. Control system as claimed in claim 8, wherein said pick-up means comprises a photo-electric cell.

10. Means for deriving a pair of phase-quadrature reference voltages comprising, a disc rotated at a predetermined rate, a semi-circular cutout formed in the periphery of said disc concentrically therewith, whereby said disc has a larger-radius and a smaller-radius semicircular portions, two sources of radiation displaced a quarter-circumference around the centre axis of said disc and spaced from said axis a distance intermediate said larger and smaller radii, and two radiation responsive pick-up means respectively aligned with said sources on the other side of the disc therefrom and adapted in response to radiations received from said sources to generate electrical voltages.

11. In a system of the type described, means for deriving a pair of phase-quadrature sine-wave reference voltages comprising, an opaque screen having a circular aperture therein, an opaque disc of smaller radius than said aperture and mounted for rotation therein about an axis coaxial with said screen aperture but excentered with relative to said disc, said disc being substantially tangent to the wall of said aperture, a pair of sources of radiation displaced a quarter circumference around said axis of rotation and spaced from said axis a distance somewhat less than the radius of said aperture, and two radiation-senstive pick-up means respectively aligned with said sources on the other side of said screen from said sources and adapted in response to the radiation received from said sources to generate electrical voltages corresponding in magnitude to the amount of received radiation.

12. In a system of the type described, means for deriving a pair of phase-quadrature triangular reference voltages comprising a rotating scanning device; rotating means synchronized with said rotating scanning device for deriving a pair of phase-quadrature square-wave voltages; and a pair of Miller type integrator networks, each including a triode having a control grid connected for receiving one of the said square-wave voltages and output electrodes adapted to deliver an integrated triangular voltage in response thereto.

13. In a circuit for receiving an input signal comprising useful periodical A.-C. pulses and a random A.-C. noise signal component, a pair of rectifiers having opposite polarity electrodes both connected together for receiving said input signal; a first integrator network having a time-constant of the order of the period of said periodical pulses conneced to the output electrode of that rectifier delivering the part of said input signal of negative polarity for substantially smoothing said part to the means value thereof during said period; a second integrator network having a time-constant substantially smaller than the former one connected to the other rectifier for smoothing the other positive part of said input signal substantially to the envelope thereof; an output electron tube having a control grid; means for biasing said tube to a predetermined potential value; and means connecting the outputs of both integrator networks to said control grid.

References Cited in the file of this patent

UNITED STATES PATENTS

| | | |
|---|---|---|
| 2,513,367 | Scott | July 4, 1950 |
| 2,646,502 | Bell | July 21, 1953 |
| 2,652,459 | White | Sept. 15, 1953 |
| 2,689,161 | Marchand | Sept. 14, 1954 |